(12) United States Patent
Hattiangadi et al.

(10) Patent No.: US 10,767,520 B1
(45) Date of Patent: Sep. 8, 2020

(54) VALVE SEAT INSERT FOR LONG LIFE NATURAL GAS LEAN BURN ENGINES

(71) Applicant: Caterpillar Inc., Deerfield, IL (US)

(72) Inventors: Ashwin A. Hattiangadi, Edwards, IL (US); Paul David Smallidge, West Lafayette, IN (US); Rong Qu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/544,182

(22) Filed: Aug. 19, 2019

(51) Int. Cl.
*F01L 3/20* (2006.01)
*F16K 1/42* (2006.01)
*F01L 3/06* (2006.01)
*F01L 3/22* (2006.01)

(52) U.S. Cl.
CPC .............. *F01L 3/20* (2013.01); *F01L 3/06* (2013.01); *F01L 3/22* (2013.01); *F16K 1/42* (2013.01)

(58) Field of Classification Search
CPC ....... F01L 3/22; F01L 3/20; F01L 3/08; F01L 1/46; F16K 1/42
See application file for complete search history.

(56) References Cited

U.S. PATENT DOCUMENTS

| | | | | |
|---|---|---|---|---|
| 2,585,658 A | * | 2/1952 | Keller | F01L 3/22 251/363 |
| 3,285,235 A | * | 11/1966 | Ueberschaer | F01L 3/22 123/188.8 |
| 5,809,968 A | * | 9/1998 | Tsuchida | F01L 1/265 123/188.8 |
| 6,035,890 A | | 3/2000 | Massicotte | |
| 6,200,688 B1 | * | 3/2001 | Liang | C22C 19/055 123/188.3 |
| 6,260,531 B1 | * | 7/2001 | Haan | F01L 3/02 123/188.8 |
| 8,876,936 B2 | | 11/2014 | Hyundai | |
| 2005/0092273 A1 | * | 5/2005 | Cecur | F01L 1/2405 123/90.16 |
| 2009/0293597 A1 | * | 12/2009 | Andrie | G01M 15/08 73/114.16 |
| 2011/0023810 A1 | * | 2/2011 | Gerard | F16K 1/425 123/193.5 |
| 2011/0203555 A1 | * | 8/2011 | Reinhart | F02D 41/3005 123/536 |
| 2014/0190441 A1 | * | 7/2014 | Chern | F01L 3/22 123/188.8 |
| 2016/0076480 A1 | * | 3/2016 | Endrigo | F01L 3/22 123/193.5 |

(Continued)

FOREIGN PATENT DOCUMENTS

CN 108868941 A 11/2018
KR 20040045752 A 6/2004

*Primary Examiner* — Long T Tran
(74) *Attorney, Agent, or Firm* — Law Office of Kurt J. Fugman LLC (57) ABSTRACT

A valve seat insert of an engine has a valve seating surface including an outer curved segment forming a first wear crown for contacting the valve at an early wear state, an inner curved segment forming a second wear crown for contacting the valve at a later wear state, and a linear segment extending between the outer and the inner curved segments. A top flow crown is set off radially inward from the engine head, and a sloping segment extending from the top flow crown is oriented at an acute angle relative to the valve seat center axis.

20 Claims, 6 Drawing Sheets

(56) References Cited

U.S. PATENT DOCUMENTS

2016/0169058 A1    6/2016  Burrows et al.
2016/0326919 A1*  11/2016  Ikemi ........................ F01L 3/18
2017/0175670 A1*   6/2017  Nishimura .............. F02B 31/02

* cited by examiner

VALVE SEAT INSERT FOR LONG LIFE NATURAL GAS LEAN BURN ENGINES

TECHNICAL FIELD

The present disclosure relates generally to engine valves and associated hardware, and more particularly to a valve seat insert for an intake valve or an exhaust valve that are configured to provide a long life natural gas lean burn for an internal combustion engine.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to effect their opening and closing actions. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions. The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. A continuing challenge to attempt valve or valve seat redesign are the often-unpredictable effects that altered geometry has on gas flow or other operating characteristics. Gas flow patterns and/or efficiency can affect in-cylinder pressure and temperature, composition of a fuel and air mixture, or other parameters potentially impacting emissions reduction strategies, engine efficiency, heat dissipation or thermal fatigue, or still other parameters.

In certain types of engines, natural gas is used. In such applications, a natural gas compression lean burn G3500 ULB/J type engine manufactured by the Applicant of the present disclosure is considered by some to be an industry leader for long top end life and durability. However, continuous improvement in this area is warranted.

Korean Published Patent Application No. KR20040045752A discloses that the angles formed by the interface between the valve and valve seat may be predetermined. However, this reference fails to disclose how to improve the longevity of a valve seat while also maintaining the desired engine performances.

SUMMARY OF THE INVENTION

In one aspect, an engine head assembly for an internal combustion engine comprises an engine head having a fluid conduit formed therein and a valve. A valve seat insert is positioned at least partially within the engine head and defining a valve seat center axis extending between a first axial end surface structured to face a cylinder in the internal combustion engine, and a second axial end surface. The valve seat insert further has an inner peripheral surface forming a throat, an outer peripheral surface, and a valve seating surface. The valve seating surface includes, in profile, an outer curved segment forming a first wear crown for contacting the valve at an early wear state, an inner curved segment forming a second wear crown for contacting the valve at a later wear state, and a linear segment extending between the outer curved segment and the inner curved segment. The inner peripheral surface including, in profile, an upper curved segment forming a top flow crown, and a sloping segment extending between the upper curved segment and the inner curved segment. The upper curved segment transitions with the second axial end surface and the top flow crown is set off radially inward from the engine head. The sloping segment is oriented at an acute angle relative to the valve seat center axis, such that the inner peripheral surface either forms a venturi to accelerate an incoming flow of gases to the cylinder or acts as a diffuser to decelerate an outgoing flow of gases from the cylinder.

In another aspect, a valve seat insert for an intake valve in an internal combustion engine comprises an annular insert body defining a valve seat center axis extending between a first axial end surface structured for facing the cylinder in the internal combustion engine, and a second axial end surface. The annular insert body further having an inner peripheral surface defining a throat structured to fluidly connect the cylinder to an intake conduit in an engine head, an outer peripheral surface, and a valve seating surface for contacting an intake valve extending between the first axial end surface and the inner peripheral surface. The valve seating surface includes, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment. The inner peripheral surface includes, in profile, an upper curved segment forming a top flow crown, and a sloping segment extending between the upper curved segment and the inner curved segment. The upper curved segment transitions with the second axial end surface. The sloping segment extends radially inward from the upper curved segment at an acute angle, of about 5° or greater, relative to the valve seat center axis, such that the inner peripheral surface forms a venturi to accelerate an incoming flow of gases to the cylinder.

In still another aspect, a valve seat insert for an exhaust valve in an internal combustion engine comprises an annular insert body defining a valve seat center axis extending between a first axial end surface structured for facing the cylinder in the internal combustion engine, and a second axial end surface. The annular insert body further have an inner peripheral surface defining a throat structured to fluidly connect the cylinder to an intake conduit in an engine head, an outer peripheral surface, and a valve seating surface for contacting an intake valve extending between the first axial end surface and the inner peripheral surface. The valve seating surface includes, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment. The inner peripheral surface includes, in profile, an upper curved segment forming a top flow crown, and a sloping segment extending between the upper curved segment and the inner curved segment. The upper curved segment transitions with the second axial end surface, and the sloping segment extends radially inward from the upper curved segment at an acute angle, of about 9° or greater, relative to the valve seat center axis, such that the inner peripheral surface forms a diffuser to decelerate an outgoing flow of gases from the cylinder.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

Figure 1:
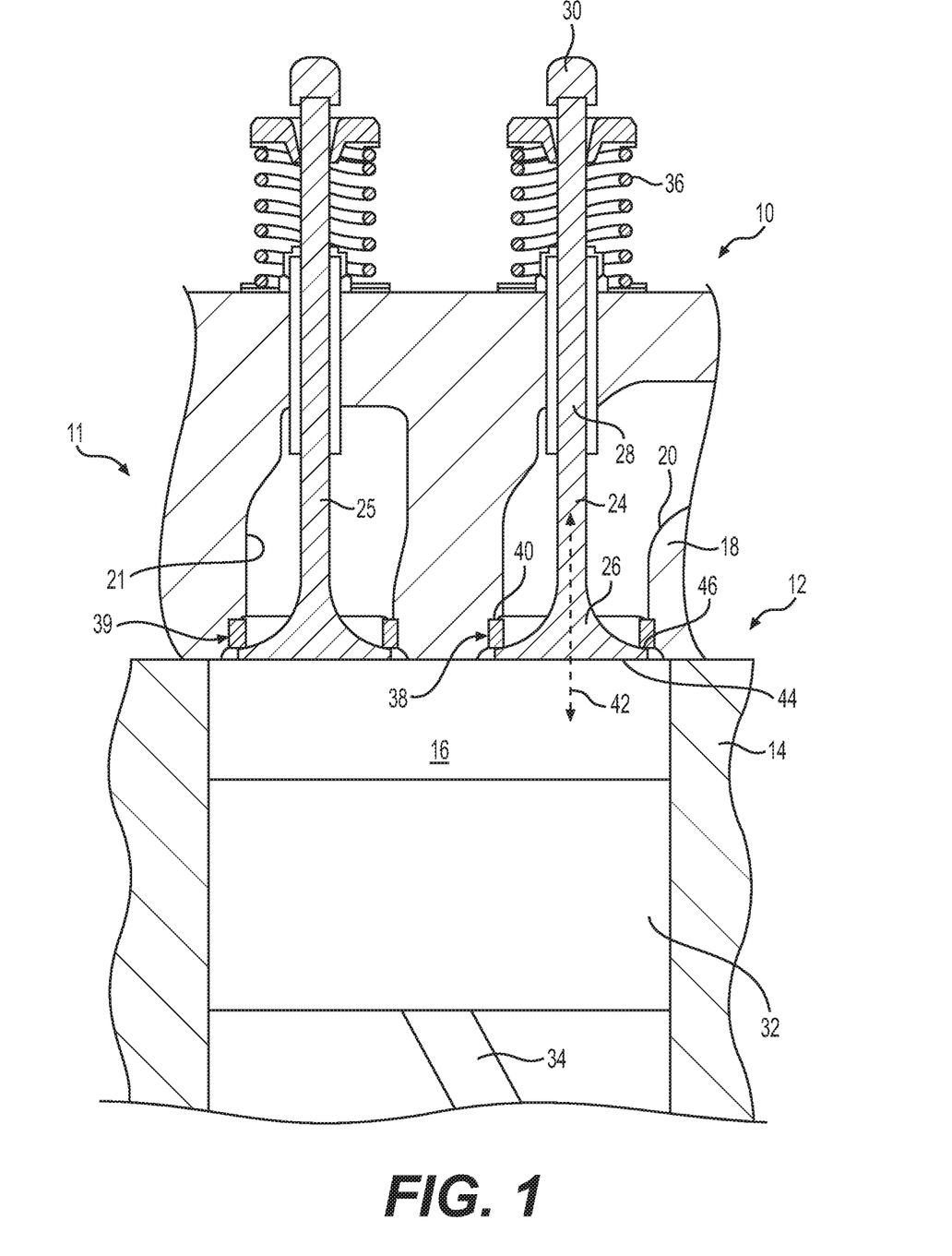
FIG. 1 is a sectioned side diagrammatic view of an internal combustion engine, according to one embodiment of the present disclosure.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, a gaseous fuel engine structured to operate on a fuel that is gaseous at standard temperature and pressure, a dual fuel engine, or still another. In a compression ignition diesel engine application, such as a direct-injected diesel engine, suitable fuels could include diesel distillate fuel, biodiesel, blends of these, or still others. For the embodiments discussed herein in particularity, the engine may run on natural gas such as the G3500 ULB/J type engine manufactured by the Applicant of the present disclosure. Other applications are to be considered within the scope of the present disclosure.

An engine head 18 is coupled to cylinder block 14 and has a first gas exchange conduit 20 and a second gas exchange conduit 21 formed therein. Gas exchange conduits 20 and 21 could each or either be an intake conduit structured to fluidly connect with an intake manifold or an exhaust conduit structured to connect with an exhaust manifold. In a practical implementation strategy, gas exchange conduit 20 is an intake conduit and gas exchange conduit 21 is an exhaust conduit.

A piston 32 is movable within cylinder 16 between a bottom dead center position and a top dead center position and is coupled to a crankshaft (not shown) by way of a connecting rod 34 in a generally conventional manner. Engine 10 could include any number of cylinders arranged in any suitable configuration such as a V configuration, an in line configuration, or still another. Engine head 18 could include a monolithic engine head associated with all of a plurality of the cylinders in engine 10, or could be one of a plurality of separate engine head sections each associated with less than all of the cylinders in engine 10.

Engine 10 further includes a first gas exchange valve 24, which can include an intake valve, and a second gas exchange valve 25, which can include an exhaust valve. Gas exchange valve 24, including aspects of its structure and operation, is discussed herein in the singular, however, it will be understood that the description of gas exchange valve 24 can apply by way of analogy to any other gas exchange valves within engine 10, except where otherwise indicated. Gas exchange valve 24 is shown more or less vertically oriented with respect to a direction of reciprocation of piston 32, however, it should also be appreciated that other configurations such as gas exchange valves at diagonal orientations are contemplated herein. Gas exchange valve 24 also includes a shaft or stem 28 connected to a valve head 26. A valve bridge 30 or the like may be coupled to gas exchange valve 24 such that gas exchange valve 24 can move together with another gas exchange valve (not shown) between open and closed positions, such as in response to rotation of a camshaft and movement of a rocker arm, a valve lifter assembly, and/or other equipment. A return spring 36 is coupled with gas exchange valve 24 in a generally conventional manner to bias the valve toward a closed position.

Engine 10 further includes an engine head assembly 11 formed by engine head 18 and a plurality of valve seat inserts 38 and 39 associated with gas exchange valves 24 and 25, respectively. Gas exchange valve 24, and by analogy other gas exchange valves of engine 10, are movable between a closed valve position and an open valve position. At the closed valve position an inner valve face 46 contacts valve seat insert 38, whereas gas exchange valve 25 contacts valve seat insert 39. At the closed position cylinder 16 is blocked from fluid communication with the corresponding gas exchange conduit 20 and 21. At the open valve position fluid communication exists. An outer valve face 44 or combustion face is oriented toward cylinder 16. As will also be further apparent from the following description, valve seat insert 38, and potentially also valve seat insert 39 is structured, together with the corresponding gas exchange valves 24 and 25, to slow and alter the nature of valve recession over the course of a service life or service interval of engine 10 and to provide intake gas flow properties at least as efficacious as, and potentially improved over, known designs.

Figure 2:
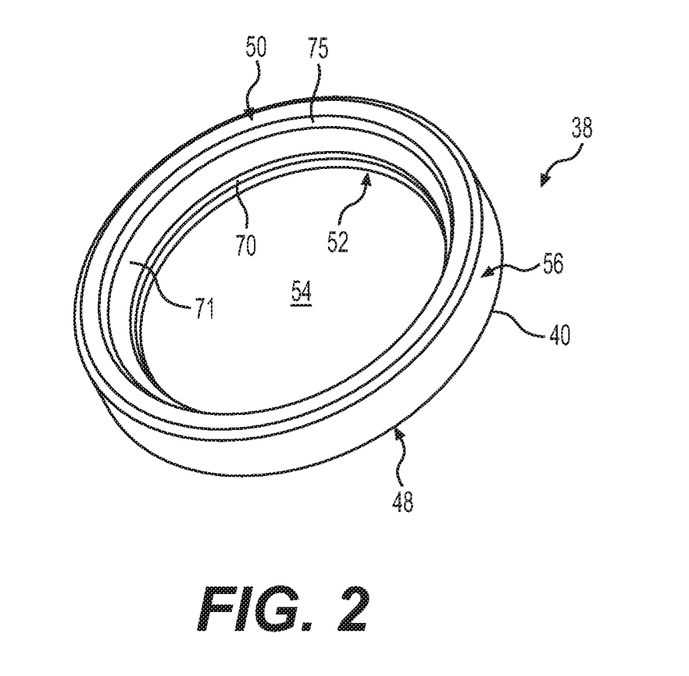
FIG. 2 is a pictorial view of a valve seat insert, according to one embodiment of the present disclosure that may be used in the internal combustion engine of FIG. 1.
Figure 3:
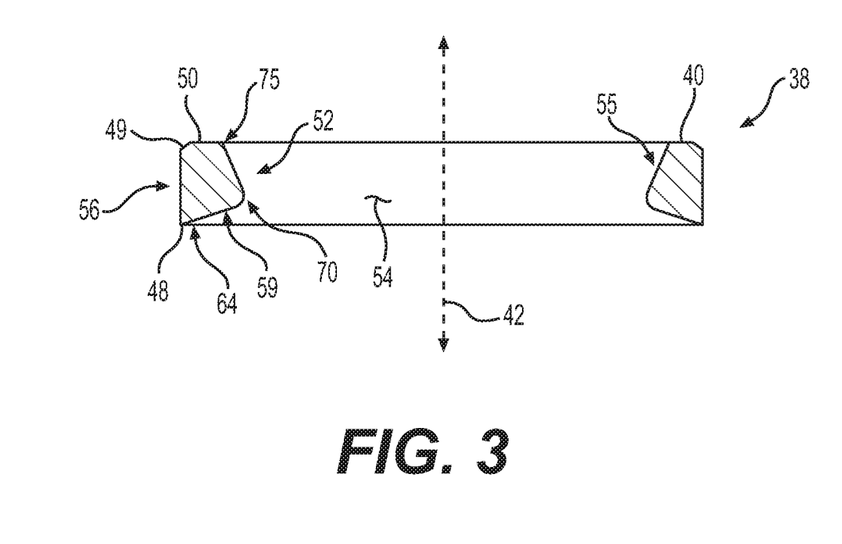
FIG. 3 is a sectioned view through the valve seat insert of FIG. 2.

Referring also now to FIGS. 2 and 3, there is shown valve seat insert 38 in greater detail. It will also be appreciated that descriptions of certain of the features of valve seat insert 38 will be understood to refer to analogous features of other valve seat inserts discussed and contemplated herein, except where otherwise indicated or apparent from the context. Valve seat insert 38 includes an annular one-piece insert body 40 that is positioned at least partially within engine head 18, such as by way of interference-fitting, and defines a valve seat center axis 42. Insert body 40 may be cast and machined and formed of a steel such as a high-alloy hardened steel or tool steel.

Valve seat insert 38 further includes a first axial end surface 48 facing cylinder 16, a second axial end surface 50, an inner peripheral surface 52 defining a throat 54 to be positioned fluidly between cylinder 16 and gas exchange conduit 20 to fluidly connect the same, an outer peripheral surface 56, and a valve seating surface 59 extending between first axial end surface 48 and inner peripheral surface 52. Valve seat center axis 42 extends between first axial end surface 48 and second axial end surface 50. Inner peripheral surface 52 is generally conical, or can have a conical portion, and can further be seen to form a taper opening in a direction of second axial end surface 50. Inner peripheral surface 52, and/or its constituent surfaces, either forms a venturi 55, narrowing toward throat 54, to accelerate an incoming flow of gases to cylinder 16 when gas exchange valve 24 (intake valve) is open, compensating for certain valve seat differences or even improving over earlier designs, having other or no special modifications to eliminate, or retard the progression of, valve seat recession. Alternatively, the inner peripheral surface 152 may form a diffuser 55' to decelerate the outgoing flow of gases from the cylinder 16 when applied to an exhaust valve (see FIG. 6).

As further discussed herein with reference to FIGS. 2 and 3, the valve seat insert 38 may have a proportionally larger valve seating surface area than certain prior designs, and somewhat less available flow area for gas exchange, with the improved venturi-accelerated flow compensating for, or more than compensating for, what might otherwise be expected to be reduced performance. Outer peripheral surface 56 has a cylindrical shape and may be located at a uniform distance from valve seat center axis 42. In an implementation, valve seat insert 38 is "dry," meaning that no additional cooling by way of engine coolant or the like is employed. Outer peripheral surface 56 may be uninterrupted in abutment against engine head 18, such that when valve seat insert 38 is positioned within engine head 18 for service, such as by way of an interference fit, there is no backside cooling void, or other cavity formed that provides liquid cooling to valve seat insert 38. A chamfer 49 may extend between outer peripheral surface 56 and second axial end surface 50. Similar statements may be made with respect to an exhaust valve application.

Figure 4:
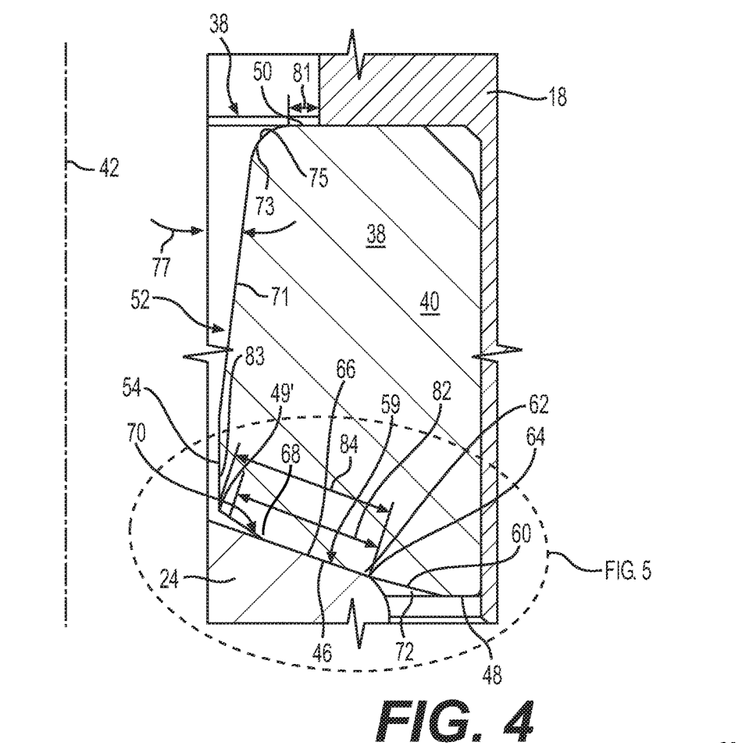
FIG. 4 is a sectioned side diagrammatic view of portions of a gas exchange (intake) valve and valve seat insert, according to one embodiment of the present disclosure that may be used in the internal combustion engine of FIG. 1.
Figure 5:
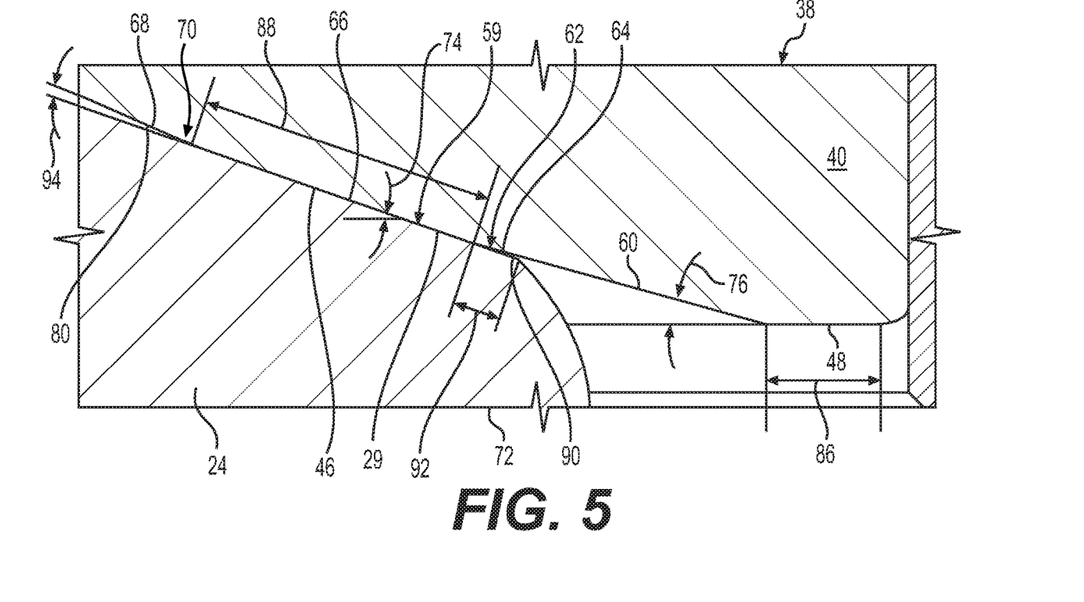
FIG. 5 is a detail view taken from circle 5 of FIG. 4.

Referring also now to FIGS. 4 and 5, it will be recalled that valve seat insert 38 is structured to slow and influence the progression of certain wear modes resulting from contact between a valve and valve seat over time. Valve seat insert 38 includes valve seating surface 59 extending between first axial end surface 48 and inner peripheral surface 52 as discussed above. Valve seating surface 59 may be profiled to limit valve recession and includes, in profile, an outer linear segment 60 adjacent to first axial end surface 48, an outer curved segment 62 adjacent to and transitioning with outer linear segment 60, an inner linear segment 66 adjacent to an transitioning with outer curved segment 62, and an inner curved segment 68 adjacent to and transitioning with inner linear segment 66. Inner linear segment 66 may be understood to be formed by a middle surface, linear in profile, that extends between and transitions with outer curved segment 62 and inner curved segment 68.

Transitions with, transitioning, and related terms, can be understood to mean that an endpoint of one line segment is also the endpoint of an adjacent line segment. Outer curved segment 62 forms a first wear crown 64 for contacting gas exchange valve 24 at an early wear state, and inner curved segment 68 forms a second wear crown 70 radially inward and axially inward of first wear crown 64 for contacting gas exchange valve 24 at a later wear state, with inner linear segment 66 extending between outer curved segment 62 and inner curved segment 68. The term "axially inward" as used herein should be understood to mean a direction that is along valve seat center axis 42 toward a midpoint of a line segment of axis 42 that corresponds to a full axial length dimension of valve seat insert 38. "Axially outward" means an opposite direction, away from that midpoint. "Radially inward" and "radially outward" are terms conventionally used.

Initial contact when valve seat insert 38 and gas exchange valve 24 are first placed in service may occur at a contact band between inner valve face 46 and first wear crown 64. As the respective components deform and wear they may transition from an early wear state where the components have a line contact, or nearly line contact, band formed between inner valve face 46 and first wear crown 64, to full face contact where inner valve face 46 is substantially parallel to and fully in contact with part of outer curved segment 62 and inner linear segment 66, and a still later wear state where full face contact is maintained but transitions also to contact with second wear crown 70. It should be appreciated that the term "early wear state" and the term "later wear state" are used herein in relation to one another, not necessarily meaning that "early" contemplates new nor that "later" contemplates old, although such terms could apply in an actual case. Certain basic principles illustrated relative to profiling of valve seating surface 59 have application to a number of different embodiments, some having additional or alternative structural details, as further discussed herein.

Inner peripheral surface 52 also includes, in profile, a sloping segment 71 that is linear and extends between inner curved segment 62 forming second wear crown 70 and an upper curved segment 73 forming a top flow crown 75. Upper curved segment 73 and thus top flow crown 75 may be formed by a radius having a size from about 0.8 millimeter to about 1.2 millimeters, and which may be about 1.0 millimeter in a refinement. As used herein, the term "radius," refers to a physical surface structure, whereas radius "size" means the dimension of a geometric radius of a circle defined by that physical surface structure. Radiuses in this context could include a single radius or multiple, varying, radiuses, splines, ellipses, etc.

Sloping segment 71 may extend circumferentially around valve seat center axis 42 and is oriented at an acute angle 77 relative to axis 42 that may be circumferentially uniform about valve seat center axis 42, equal to about 5° or greater, and more particularly about 6° to about 8°, and may be about 7° in some embodiments. Sloping segment 71 may further transition with each of upper curved segment 73 and inner curved segment 68 (other geometry including straight lines, curves, etc. may be interposed), with throat 54 being defined by a vertical segment 83. Incoming flow crown 75, and upper curved segment 73, transitions with second axial end surface 50 and is set off radially inward from engine head 18 a set off distance 81 that may be greater than the size of the radius forming upper curved segment 73. A size of the radius forming the inner curved segment 68 and thus second wear crown 70 may be from about 0.4 millimeters to about 0.6 millimeters, and more particularly may be about 0.5 millimeters. A size of a radius forming the outer curved segment 62 is from about 5.0 millimeters to about 6.0 millimeters In the illustrations of FIGS. 4 and 5, it can also be seen that inner valve face 46 is oriented at a valve angle 74 relative to a plane 72 that is oriented normal to valve seat center axis 42. Inner linear segment 66 is oriented at a seat angle 76 relative to plane 72 that is larger than valve angle 74. An interference angle 78 is formed by inner valve face 46 and inner linear segment 66, and a clearance 80 is formed between inner valve face 46 and inner linear segment 66. Valve angle 74 may differ from seat angle 76 by about 0.3° to about 0.5° (e.g. about 0.4°). Seat angle 76 may be from about 10° to about 20°, and seat angle 76 may be about 15° in one practical implementation. As used herein, the term "about" should be understood in the context of conventional rounding to a consistent number of significant digits. Accordingly, "about 20" means from 19.5 to 20.4, "about 19.5" means from 19.45 to 19.54, and so on.

A second clearance 90 may be formed between inner valve face 46 and outer curved segment 62 and extends radially outward and axially outward from a contact band formed at the early wear state approximately as depicted, between inner valve face 46 and first wear crown 64. It will be recalled that the initial contact band may have an annular form and may be substantially a line contact pattern but expected to commence changing toward a face contact pattern as early break-in occurs. A size of the second clearance 90 may include a facing length 92 that is about 0.4 millimeter to about 0.6 millimeter (e.g. about 0.538 millimeter), between inner valve face 46 and outer curved segment 62 of valve seating surface 59. Facing length 92 can be understood as the distance from the contact band to an outer edge of the upwardly facing shut off surface 29 of the valve head 26. Another angle 94 may be formed between lower chamfer 49' and the upwardly facing shut off surface 29, and may be about 10° to about 20° (may be about 12.922° or about 15° in certain embodiments).

Also shown in FIG. 4 is a full seating width dimension 84 or theoretical full seating width of valve seat insert 38 that may eventually become available as wear between the components progresses, in comparison to a break-in face contact width obtained when full face contact initially occurs. Break-in face contact width is shown at 82 and could be observed after early break-in. In an implementation, full seating width 84 might be about 4 millimeters, more particularly about 3.7 millimeters. Break-in face contact width 82 in the embodiment of FIG. 4 may be about 3 millimeters, more particularly about 3.25 millimeters. An end face width of first axial end surface 48 is shown at 86 in FIG. 5 and may be about 1 millimeter (e.g. about 0.813 millimeter). A linear segment width of outer linear segment 60 is shown at 88 and may be about 2.0 millimeters.

Figure 6:
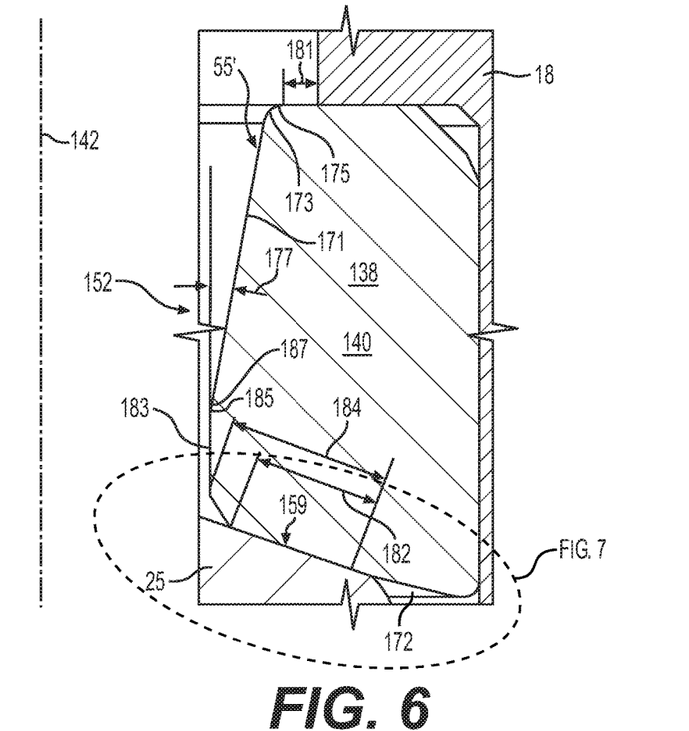
FIG. 6 is a sectioned side diagrammatic view of portions of a gas exchange (exhaust) valve and valve seat insert, according to another embodiment of the present disclosure that may be used in the internal combustion engine of FIG. 1.
Figure 7:
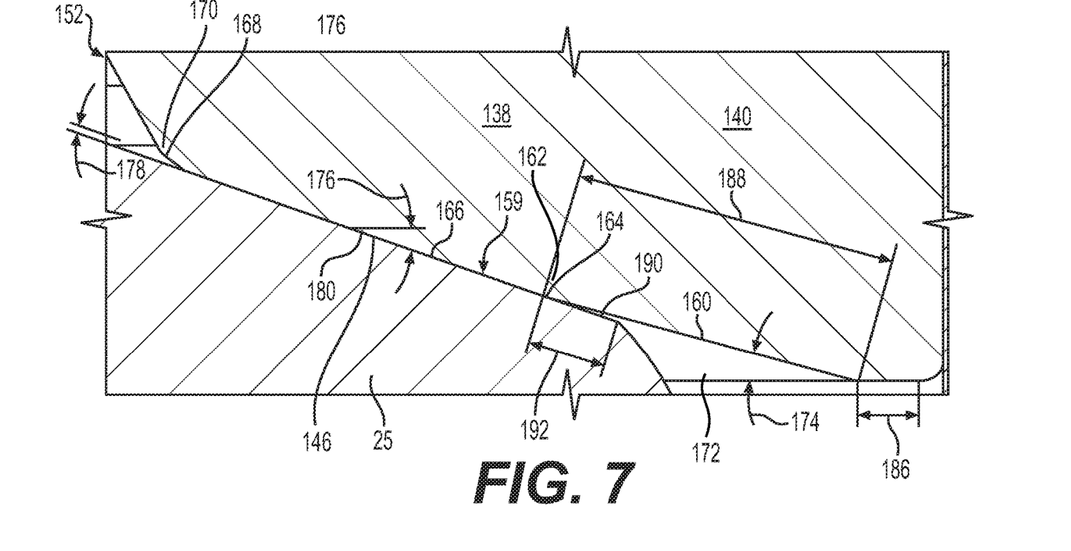
FIG. 7 is a detail view taken at circle 7 of FIG. 6.

Turning now to FIGS. 6 and 7, there are shown features of a valve seat insert 138 and an annular insert body 140 in contact with a gas exchange valve 25, which can include an exhaust valve, according to another embodiment of the present disclosure. Valve seat insert 138 includes a valve seating surface 159 profiled to limit valve recession and includes, in profile, an outer linear segment 160 adjacent to a first axial end surface (not numbered), an outer curved segment 162 adjacent to and transitioning with outer linear segment 160 and forming a first wear crown 164 contacted by gas exchange valve 25 at an early wear state. Valve seating surface 159 further includes an inner linear segment 166 adjacent to and transitioning with outer curved segment 162, and an inner curved segment 168 adjacent to and transitioning with inner linear segment 166 and forming a second wear crown 170 radially inward and axially inward of first wear crown 164 and contacted by gas exchange valve 25 at a later wear state.

An inner valve face 146 is oriented at a valve angle 174 relative to a plane 172 normal to a valve seat center axis 142. Inner linear segment 166 is oriented at a seat angle 176 relative to plane 172 that is larger than valve angle 174 such that an interference angle 178 is formed. A clearance 180 is formed between gas exchange valve 25 and inner linear segment 166. Seat angle 176 may be from about 10° to about 20° and may be about 15°. An interference angle 178 may be about 0.3° to about 0.5°, and more particularly about 0.4°.

A second clearance 190, as shown in FIG. 6 and FIG. 7, extends radially outward and axially outward from a contact band between inner valve face 146 and first crown 164. In valve seat insert 138, which can include an exhaust valve seat insert, a full seating width dimension 184 may be about 4 millimeters, more particularly about 3.64 millimeters to about 3.84 millimeters. A break-in face contact width 182 may be about 2.75 millimeters to about 3.25 millimeters, more particularly about 2.8 millimeters to about 3.0 millimeters. A linear segment width 188 may be about 2.669 millimeters, and an end face width 186 may be about 0.46 millimeter. A clearance facing length 192 may be about 0.749 millimeter.

Valve seat insert 138 also includes an inner peripheral surface 152 having a lower linear segment (vertical segment 183) extending between and transitioning with each of second wear crown 170 and a second flow crown 187 formed by a lower curved segment 185, and a sloping segment 171 extending between and transitioning with each of lower curved segment 185 and an upper curved segment 173 forming a top flow crown 175. The top flow crown 175 is set off a set off distance 181 from engine head 18 that is greater than a size of a radius forming upper curved segment 173 and thus incoming flow crown 175. Similarly, the outer curved segment 162 is formed by a radius that is larger than the radius forming the upper curved segment 173.

Inner peripheral surface 152 also includes a vertical segment 183 oriented parallel to valve seat center axis 142 and transitioning with each of lower curved segment 185 and upper curved segment 173. A throat (not numbered, may define an inner diameter of the valve seat insert of about 46.84 mm to about 47.21 mm) is defined by vertical segment 183. In an implementation, a running length of vertical segment 183 is about 1.3 millimeters to about 1.6 millimeters (e.g. may be about 1.5 millimeters) but may be from about 0.0 millimeters to about 2.5 millimeters (or more particularly about 1.0 millimeter to about 2.0 millimeters). A size of the radius forming upper curved segment 173 may be about 0.5 millimeter (e.g. ranging from about 0.4 millimeter to about 0.6 millimeter). A size of the radius forming second wear crown 70 may be about 0.3 millimeter to about 0.5 millimeter (e.g. about 0.4 millimeter). A break-in face contact width 182 may be about 3.0 millimeters, and more particularly about 2.80 millimeters to about 3.0 millimeters. A full face contact width 184 may be about 4.0 millimeters, and more particularly about 3.64 millimeters to about 3.84 millimeters. An acute angle 177 may be about 9° or greater, and more particularly about 10° to 11° (e.g. about 10.28°). A size of a radius forming the outer curved segment 162 is from about 3.0 millimeters to about 4.0 millimeters.

As suggested above, various features and proportions of the different valve seat insert embodiments may be within common dimensional or proportional ranges, with the illustrated embodiments representing different practical implementation strategies. Following are general dimensional and angular ranges discovered to provide suitable core design principles.

A size of outer curved segment 62, 162 forming first wear crown 64, 164 may be larger than a size of inner curved segment 68, 168 forming second wear crown 70, 170. Similarly, outer curved segment 62, 162 may be formed by a radius having a size from about 3 millimeters to about 6 millimeters. Inner curved segment 68, 168 may be formed by a radius having a size from about 0.3 millimeters to about 0.6 millimeters. The radius forming inner curved segment 80, 180 and thus second wear crown 70, 170 may be smaller than each of the radius forming outer curved segment 62, 162 and thus first wear crown 64, 164 and the radius forming inner curved segment 68, 168 and thus second wear crown 70, 170.

Similarly, the outer curved segment 62, 162 may be formed by a radius larger than the radius forming the upper curved segment 72, 173. The radius forming upper curved segment 73, 173 may be larger than the radius forming inner curved segment 68, 168. Full face contact width 84, 184 may be from about 3 millimeters to about 4 millimeters, more particularly from about 3.64 millimeters to about 3.84 millimeters. Break-in face contact width 82, 182 may be from about 2 millimeters to about 4 millimeters, more particularly from about 2.80 millimeters to about 3.00 millimeters. Interference angle 78, 178 may be from about 0.3° to about 0.5°, and more particularly about 0.4°. Facing length 88, 188 may be from about 0.4 millimeters to about 0.90 millimeters. Acute angle 77, 177 may be from about 5° to about 15°, more particularly from about 7° to about 10.28°. A running length of inner linear segment 66, 166 can vary consistent with the full face width range and other valve seating surface parameters discussed herein. The radius forming upper curved segment 75, 175 and thus first flow crown 75, 175 may be from about 0.4 millimeter to about 1.2 millimeters. Lower curved segment 185 and thus second flow crown 187 may be formed by a radius that is from about 1 millimeter to about 7 millimeters and particularly about 2.0 millimeters and about 5.4 millimeters. The radius forming second flow crown 187 may be larger than each of the radius forming outer curved segment 62 and thus first wear crown 164 and the radius forming upper curved segment 173 and thus top flow crown 175.

INDUSTRIAL APPLICABILITY

In practice, a machine, an engine used by the machine, a valve seat insert, a valve, and/or any combination of these various assemblies and components may be manufactured, bought, or sold to retrofit a machine, or an engine already in the field in an aftermarket context, or alternatively, may be manufactured, bought, sold or otherwise obtained in an OEM (original equipment manufacturer) context.

As alluded to previously herein, the aforementioned embodiments may increase the life of the valve seat insert and/or valve while maintaining or even improving engine performance(s) as will be elaborated further herein momentarily.

In an engine 10, the valve seat insert 38, 138 may include the upper curved segment 73, 173 may transition with the second axial end surface 50 and the top flow crown 75, 175 may be set off radially inward from the engine head 10. The sloping segment 71, 171 may be oriented at an acute angle 77, 177 relative to the valve seat center axis 42, such that the inner peripheral surface 52, 152 either forms a venturi 55 to accelerate an incoming flow of gases to the cylinder 16 or a diffuser 55' to decelerate an outgoing flow of gases from the cylinder 16.

The acute angle 77, 177 may range from about 5° to about 20° in certain embodiments.

In further embodiments, the linear segment of the valve seating surface 59, 159 defines a break-in face contact width 82, 182 that is from about 1.5 millimeters to about 3.5 millimeters, and the sloping segment 71, 171 has a running length that is greater than the break-in face contact width 82, 182.

In certain embodiments, the top flow crown 75, 175 is set off radially inward from the engine head 10 a distance 81, 181 that is greater than a size of a radius forming the upper curved segment 73, 173.

In some embodiments, the size of the radius forming the upper curved segment 73, 173 is from about 0.2 millimeter to about 1.0 millimeter, a size of a radius forming the outer curved segment 62, 162 is from about 3 millimeters to about 6 millimeters, and a size of a radius forming the inner curved segment 68, 168 is from about 0.3 millimeter to about 0.6 millimeter.

In certain embodiments, a vertical segment 83, 183 connects the upper curved segment 73, 173 to the inner curved segment 68, 168, and the throat 54 is defined by the vertical segment 83, 183. The vertical segment 83, 183 may define a height that ranges from about 1.0 millimeters to about 2.0 millimeters.

In some embodiments, the lower curved segment forms a second flow crown 185.

In the engine 10, the cylinder 16 is in fluid communication with the fluid conduit (e.g. intake conduit 20, exhaust conduit 21), a piston 32 is disposed in the cylinder 16 that is configured to translate upwardly and downwardly in the cylinder 16, and a valve (e.g. an intake valve 24 or an exhaust valve 25) is disposed between the piston 32 and the valve seat insert 38, 138, the valve including an upwardly facing shut off surface 29 that is configured to engage and disengage the valve seat insert 38, 138. The upwardly facing shut off surface 29 may be flat.

Figure 8:
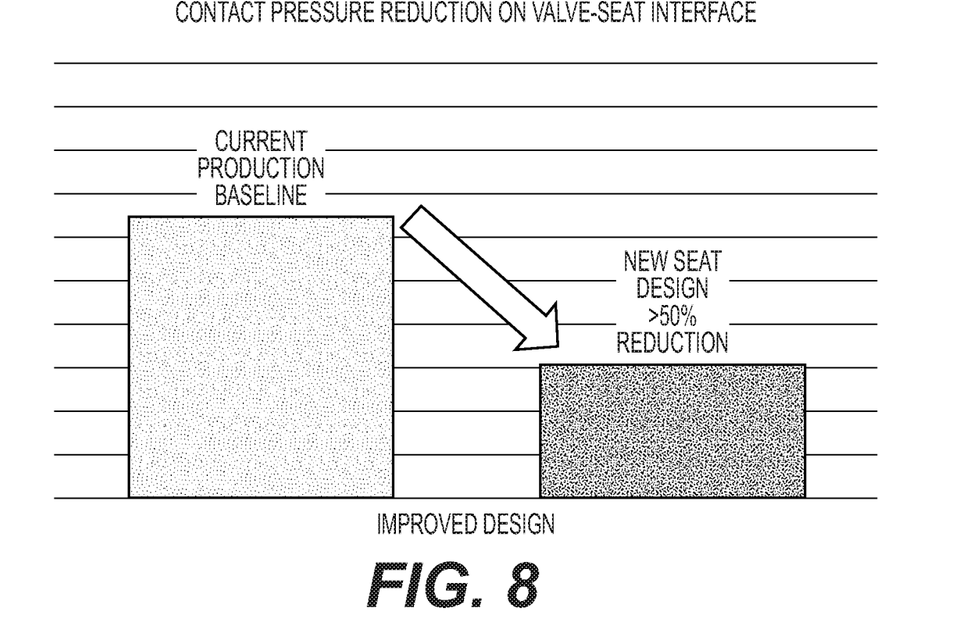
FIG. 8 is a comparative chart of a valve seat insert in an engine head in proximity to an intake valve or an exhaust valve, according various embodiments and principles of the present disclosure, in comparison with a previous design to show reduced contact stresses (pressures)

Referring now to FIG. 8, there is a comparative chart showing how the embodiments of the present disclosure (depicted at the right of the chart) have reduced the contact pressures (stresses) by as much as 50% compared to previous designs (see the bar to the left). This may be due to increased contact area between the valve and the valve seat. So, one skilled in the art would expect that various embodiments of the present disclosure will have an improved longevity, necessitating less maintenance over the life of the engine.

Valve seat inserts can play a key role in engine performance and durability by way of wear performance for engine head life. Optimizing air flow at the same time as reducing wear has proven to be a great challenge. During operating an engine, intake valves reciprocate into and out of contact with a valve seat insert. Gases including air or air mixed with other gases such as recirculated exhaust gas or gaseous fuel, is typically supplied at a pressure greater than atmospheric pressure to the engine, such as from a turbocharger compressor. Downward travel of a piston in conjunction with the pressurization of the intake gases, causes the intake gases to rush into the cylinder as the piston moves from a top dead center position toward a bottom dead center position in an intake stroke so long as the intake valve is open.

According to the present disclosure, intake gases encountering top flow crown 75 will tend to flow relatively smoothly past top flow crown 75 and enter the venturi 55 formed by inner peripheral surface 52. Upon entering the venturi, the incoming gases will begin to accelerate according to known principles toward the associated cylinder. The accelerated intake gases can then be expected to flow smoothly around second flow crown 87, and around second wear crown 70 past valve seating surface 59 and eventually around and past gas exchange valve 24 and into the associated cylinder for combustion with fuel therein. The smooth and accelerating flow through the valve seat inserts of the present disclosure can compensate for, or more than compensate for, the reduced flow area as compared to the design of valve seat insert 38 and other designs with sacrificing valve seat or valve performance or engine service life.

Figure 9:
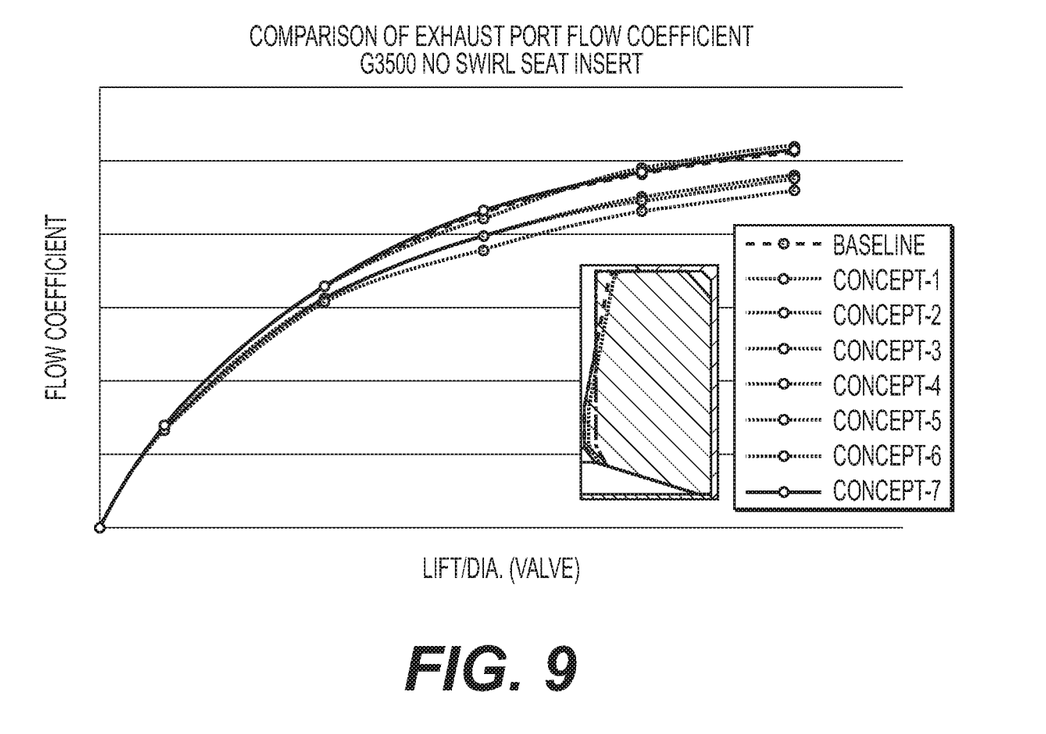
FIG. 9 is a graph of flow coefficient in comparison to valve lift/diameter for exhaust port designs according to the present disclosure and a previous design.

FIG. 9 shows that the exhaust port flow coefficient of various embodiments of the present disclosure is about the same as that of previous designs in no swirl applications. So, one skilled in the art would not expect a degradation of the engine performance in terms of fluid mechanics, thermodynamics, emissions, etc. while also reducing the interval needed for maintaining the valve seat insert or the valve, etc. Thus, one skilled in the art may surmise that the compromise (tradeoff) between longevity and other engine performances has been broken using various embodiments of the present disclosure.

Figure 10:
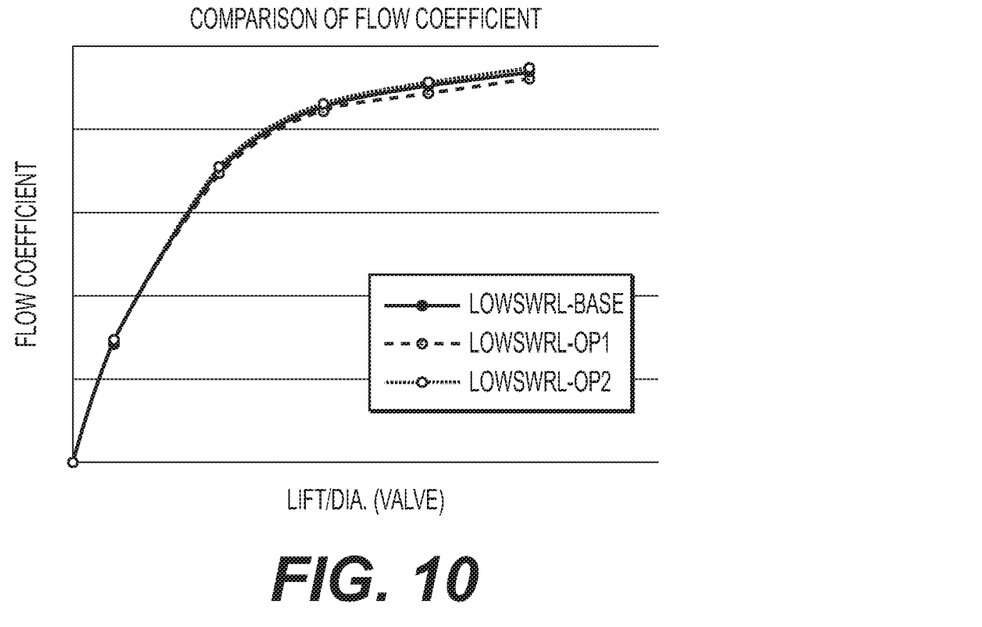
FIG. 10 is a graph of flow coefficient in comparison to valve lift/diameter for intake port designs according to the present disclosure and a previous design.

Likewise, FIG. 10 shows that the flow coefficient remains the same between various embodiments of the present disclosure and the baseline (previous design) in low swirl applications. Again, one skilled in the art would not expect a degradation of the engine performance in terms of fluid mechanics, thermodynamics, emissions, etc. while also reducing the interval needed for maintaining the valve seat insert or the valve, etc. Thus, one skilled in the art may surmise that the compromise (tradeoff) between longevity and other engine performances has been broken using various embodiments of the present disclosure.

Figure 11:
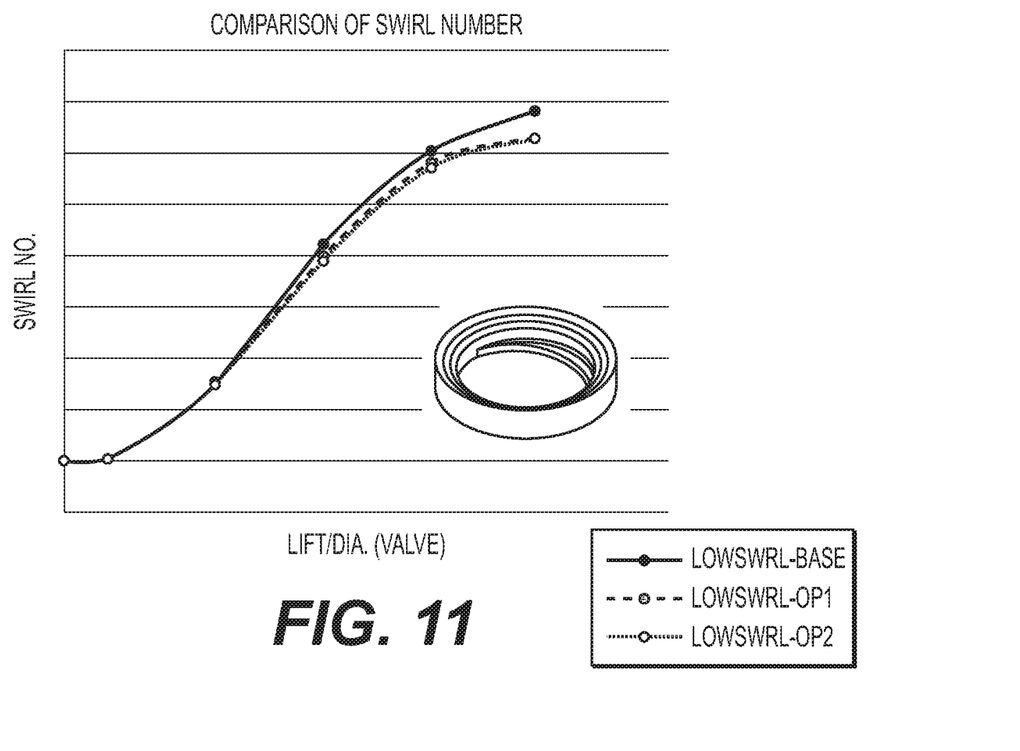
FIG. 11 is a graph of swirl number in comparison to valve lift/diameter for exhaust port designs according to the present disclosure and a previous design.

FIG. 11 shows that the swirl number of various embodiments of the present disclosure and the baseline (previous design) remains relatively close to or even less than the baseline. So, one skilled in the art would not expect a degradation of the engine performance in terms of fluid mechanics, thermodynamics, emissions, etc. while also reducing the interval needed for maintaining the valve seat insert or the valve, etc. Thus, one skilled in the art may surmise that the compromise (tradeoff) between longevity and other engine performances has been broken using various embodiments of the present disclosure.

The valve seating diameter associated with valve seat insert 38, 138 is less than full face contact widths associated with valve seat inserts 38, 138 and that valve seat insert 38, 138 is not formed with wear crowns or certain other specialized valve seating geometry. The wear crowns discussed herein, in conjunction with the valve seating contact widths, seat angles, valve angles, and other geometric features, are designed in a manner that can be understood as cushioning valve-valve seat impacts to reduce valve seat beat-in as well as slowing certain wear modes. Providing a valve seat geometry in line with such goals can improve over valve seat designs such as that used in valve seat insert 38, 138 but has been discovered to place certain limitations on the design of other valve seat insert characteristics such as gas flow properties.

Along such lines, the geometry of valve seat insert 38, 138 with respect to intake valve seating properties, and the geometry of valve seat insert 38, 138 with respect to intake gas flow properties can be understood as a system of cross-coupled variables where modifying one aspect of valve seat insert geometry can affect another aspect of valve seat insert geometry, often in unpredictable ways. For instance, providing second wear crown 70, 170 tends to require throat diameter to be reduced if valve seating diameter is to be maintained or increased. In the case of second wear crown 70, 170, too large a radius could impact flow area, acute angle, seat angle, or other parameters. Too small a radius could fail to provide desired flow patterns and/or compromise desired valve seating performance.

Incorporating top flow crown 75, 175 and positioning top flow crown 75, 175 so as to be set off from the engine head can further reduce available flow area over what might be obtained with a valve seat insert having no top flow crown and no set off from the engine head. If the radius forming a top flow crown is too small, for instance, the beneficial effects on incoming flow of intake gases might not be realized. If the radius forming a top flow crown is too large, then the acute angle might be too narrow to achieve a desired acceleration of flow. Additional factors such as determining a suitable acute angle range, a seat angle range, whether a second flow crown is used, and still others can have similar effect. Where more than one design parameter is varied from design to design, the effects on performance can be still more complex and unpredictable. For these general reasons, it will be appreciated that the optimized designs and parametric guidelines of the present disclosure offer a practical balancing of factors bearing on valve seating and intake gas flow performance. In some cases, the compromise may actually be broken.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An engine head assembly for an internal combustion engine comprising:
   an engine head having a fluid conduit formed therein;
   a valve;
   a valve seat insert positioned at least partially within the engine head and defining a valve seat center axis extending between a first axial end surface structured to face a cylinder in the internal combustion engine, and a second axial end surface;
   the valve seat insert further having an inner peripheral surface forming a throat, an outer peripheral surface, and a valve seating surface;
   the valve seating surface including, in profile, an outer curved segment forming a first wear crown for contacting the valve at an early wear state, an inner curved segment forming a second wear crown for contacting the valve at a later wear state, and a linear segment extending between the outer curved segment and the inner curved segment;
   the inner peripheral surface including, in profile, an upper curved segment forming a top flow crown, and a sloping segment extending between the upper curved segment and the inner curved segment; and
   the upper curved segment transitioning with the second axial end surface and the top flow crown being set off radially inward from the engine head, and the sloping segment being oriented at an acute angle relative to the valve seat center axis, such that the inner peripheral surface either forms a venturi to accelerate an incoming flow of gases to the cylinder or a diffuser to decelerate an outgoing flow of gases from the cylinder.

2. The engine head assembly of claim 1 wherein the acute angle is from about 5° to about 20°.

3. The engine head assembly of claim 2 wherein the linear segment of the valve seating surface defines a break-in face contact width that is from about 1.5 millimeters to about 3.5 millimeters, and the sloping segment has a running length that is greater than the break-in face contact width.

4. The engine head assembly of claim 3 wherein the top flow crown is set off radially inward from the engine head a distance that is greater than a size of a radius forming the upper curved segment.

5. The engine head assembly of claim 3 wherein the size of the radius forming the upper curved segment is from about 0.2 millimeter to about 1.0 millimeter, a size of a radius forming the outer curved segment is from about 3 millimeters to about 6 millimeters, and a size of a radius forming the inner curved segment is from about 0.3 millimeters to about 0.6 millimeters.

6. The engine head assembly of claim 3 further comprising a vertical segment connecting the upper curved segment to the inner curved segment, and the throat is defined by the vertical segment.

7. The engine head assembly of claim 3 wherein the lower curved segment forms a second flow crown.

8. The engine head assembly of claim 6 wherein the vertical segment defines a height that ranges from about 1.0 millimeter to about 2.0 millimeters.

9. The engine head assembly of claim 1 further comprising a cylinder that is in fluid communication with the fluid conduit, a piston disposed in the cylinder that is configured to translate upwardly and downwardly in the cylinder, and the valve is disposed between the piston and the valve seat insert, the valve including an upwardly facing shut off surface that is configured to engage and disengage the valve seat insert.

10. The engine head assembly of claim 9 wherein the upwardly facing shut off surface is flat.

11. A valve seat insert for an intake valve in an internal combustion engine comprising:
   an annular insert body defining a valve seat center axis extending between a first axial end surface structured for facing the cylinder in the internal combustion engine, and a second axial end surface;
   the annular insert body further having an inner peripheral surface defining a throat structured to fluidly connect the cylinder to an intake conduit in an engine head, an outer peripheral surface, and a valve seating surface for contacting an intake valve extending between the first axial end surface and the inner peripheral surface;
   the valve seating surface including, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment;

the inner peripheral surface including, in profile, an upper curved segment forming a top flow crown, and a sloping segment extending between the upper curved segment and the inner curved segment; and the upper curved segment transitioning with the second axial end surface, and the sloping segment extending radially inward from the upper curved segment at an acute angle, of about 5° or greater, relative to the valve seat center axis, such that the inner peripheral surface forms a venturi to accelerate an incoming flow of gases to the cylinder.

12. The valve seat insert of claim 11 wherein the upper curved segment is formed by a radius larger than a radius forming the inner curved segment, and the outer curved segment is formed by a radius larger than the radius forming the upper curved segment.

13. The valve seat insert of claim 11 wherein the acute angle is from about 6° to about 8°.

14. The valve seat insert of claim 11 wherein:

the linear segment of the valve seating surface defines a break-in face contact width that is from about 3 millimeters to about 4 millimeters;

a size of a radius forming the upper curved segment is from about 0.8 millimeters to about 1.2 millimeters;

a size of a radius forming the outer curved segment is from about 5.0 millimeters to about 6.0 millimeters; and a size of a radius forming the inner curved segment is from about 0.4 millimeter to about 0.6 millimeter.

15. The valve seat insert of claim 14 further comprising a vertical segment connecting the upper curved segment to the inner curved segment, and a throat is defined by the vertical segment.

16. A valve seat insert for an exhaust valve in an internal combustion engine comprising:

an annular insert body defining a valve seat center axis extending between a first axial end surface structured for facing the cylinder in the internal combustion engine, and a second axial end surface;

the annular insert body further having an inner peripheral surface defining a throat structured to fluidly connect the cylinder to an exhaust conduit in an engine head, an outer peripheral surface, and a valve seating surface for contacting an exhaust valve extending between the first axial end surface and the inner peripheral surface;

the valve seating surface including, in profile, an outer curved segment forming a first wear crown for contacting the exhaust valve at an early wear state, an inner curved segment forming a second wear crown for contacting the exhaust valve at a later wear state, and a linear segment extending between the outer curved segment and the inner curved segment;

the inner peripheral surface including, in profile, an upper curved segment forming a top flow crown, and a sloping segment extending between the upper curved segment and the inner curved segment; and the upper curved segment transitioning with the second axial end surface, and the sloping segment extending radially inward from the upper curved segment at an acute angle, of about 9° or greater, relative to the valve seat center axis, such that the inner peripheral surface forms a diffuser to decelerate an outgoing flow of gases from the cylinder.

17. The valve seat insert of claim 16 wherein the upper curved segment is formed by a radius larger than a radius forming the inner curved segment, and the outer curved segment is formed by a radius larger than the radius forming the upper curved segment.

18. The valve seat insert of claim 16 wherein the acute angle is from about 10° to about 11°.

19. The valve seat insert of claim 16 wherein:

the linear segment of the valve seating surface defines a break-in face contact width that is from about 2.75 millimeters to about 3.25 millimeters;

a size of a radius forming the upper curved segment is from about 0.4 millimeter to about 0.6 millimeter;

a size of a radius forming the outer curved segment is from about 3.0 millimeters to about 4.0 millimeters; and a size of a radius forming the inner curved segment is from about 0.3 millimeter to about 0.5 millimeter.

20. The valve seat insert of claim 19 further comprising a vertical segment connecting the upper curved segment to the inner curved segment, and the throat is defined by the vertical segment.

* * * * *